United States Patent [19]
Agnesina et al.

[11] Patent Number: 6,130,639
[45] Date of Patent: Oct. 10, 2000

[54] METHOD FOR FINE MODELLING OF GROUND CLUTTER RECEIVED BY RADAR

[75] Inventors: Eric Agnesina, Antony; Jean-Philippe Henry, Vanves; Daniel Le Hellard, Nantes; Michel Moruzzis, La Norville, all of France

[73] Assignee: Thomson-CSF, Paris, France

[21] Appl. No.: 09/155,411

[22] PCT Filed: Jan. 23, 1998

[86] PCT No.: PCT/FR98/00123

§ 371 Date: Sep. 28, 1998

§ 102(e) Date: Sep. 28, 1998

[87] PCT Pub. No.: WO98/33074

PCT Pub. Date: Jul. 30, 1998

[30] Foreign Application Priority Data

Jan. 27, 1997 [FR] France .................................. 97 00842

[51] Int. Cl.[7] .................................................. G01S 7/40
[52] U.S. Cl. .................... 342/169; 342/162; 342/179; 342/191; 342/195
[58] Field of Search .......................... 342/25, 123, 135, 342/162, 169, 179, 191, 195

[56] References Cited

U.S. PATENT DOCUMENTS

| | | | |
|---|---|---|---|
| 3,612,934 | 10/1971 | Henry ......................................... | 313/39 |
| 3,684,963 | 8/1972 | Henry ......................................... | 455/18 |
| 3,768,044 | 10/1973 | Henry et al. ............................. | 333/17.2 |
| 3,896,478 | 7/1975 | Henry ......................................... | 257/625 |
| 3,953,730 | 4/1976 | Henry et al. ....................... | 250/227.28 |
| 3,982,267 | 9/1976 | Henry ......................................... | 257/617 |
| 4,097,986 | 7/1978 | Henry et al. ............................. | 438/113 |
| 4,141,135 | 2/1979 | Henry et al. ............................. | 438/108 |
| 4,141,136 | 2/1979 | Henry et al. ............................. | 438/113 |
| 4,192,574 | 3/1980 | Henry et al. ............................... | 385/94 |
| 4,291,942 | 9/1981 | Henry et al. ............................... | 385/94 |
| 4,321,601 | 3/1982 | Richman . | |
| 4,326,771 | 4/1982 | Henry et al. ............................... | 385/92 |
| 4,396,247 | 8/1983 | Simon et al. .............................. | 385/86 |

(List continued on next page.)

OTHER PUBLICATIONS

McMahon, J.S. et al, "Space–time adaptive processing on the Mesh Synchronous Processor", Parallel Processing Symposium, 1996, Proceedings of IPPS '96, The 10th International, 1996, pp.: 734–740.

Preiss, B. et al, "A 3D Perspective for radar cross section visualization", Aerospace Conference, 1997. Proceedings., IEEE, vol.: 2, 1997, pp.: 95–112 vol. 2.

Smits, P.C. et al, "SAR image interpretation based on Markov mesh random fieldsmodels", Geoscience and Remote Sensing, 1997. IGARSS '97. RemoteSensing—A Scientific Vision for Sustainable Development., 1997IEEE International vol.: 2, 1997, p. 7.

(List continued on next page.)

*Primary Examiner*—John B. Sotomayor
*Attorney, Agent, or Firm*—Oblon, Spivak, McClelland, Maier & Neustadt, P.C.

[57] ABSTRACT

A process for modelling of ground clutter received by a radar, starting from a meshed numerical terrain model, including identifying cells from the meshed numerical terrain model which comprise elements having a height greater than a resolution of the model; determining, for relevant cells, an average height of the elements; sectioning the relevant cells into height-wise slices; and calculating power backscattered by each of the relevant cells by representing contents thereof with elementary reflectors distributed over an entire height thereof as a function of adjoining cells and a profile of terrain situated between the radar and a relevant cell.

7 Claims, 1 Drawing Sheet

U.S. PATENT DOCUMENTS

| | | | |
|---|---|---|---|
| 4,437,077 | 3/1984 | Henry et al. | 333/245 |
| 4,456,334 | 6/1984 | Henry et al. | 385/90 |
| 4,559,474 | 12/1985 | Duret et al. | 315/3.6 |
| 4,570,172 | 2/1986 | Henry et al. | 257/97 |
| 4,571,559 | 2/1986 | Henry et al. | 333/17.2 |
| 4,635,203 | 1/1987 | Merchant | 364/458 |
| 4,660,008 | 4/1987 | Henry et al. | 333/258 |
| 4,665,609 | 5/1987 | Henry et al. | 438/73 |
| 4,695,959 | 9/1987 | Lees et al. | 364/458 |
| 4,696,094 | 9/1987 | Yves et al. | 438/93 |
| 4,728,787 | 3/1988 | Henry et al. | 250/252.1 |
| 4,736,235 | 4/1988 | Henry | 257/735 |
| 4,749,903 | 6/1988 | Munier et al. | 313/366 |
| 4,751,423 | 6/1988 | Munter et al. | 313/366 |
| 4,784,702 | 11/1988 | Henri | 136/258 |
| 4,812,895 | 3/1989 | Funck et al. | 257/626 |
| 4,829,355 | 5/1989 | Munier et al. | 257/11 |
| 4,915,286 | 4/1990 | Mentzer et al. | 228/173.5 |
| 4,940,901 | 7/1990 | Henry et al. | 250/370.09 |
| 4,970,432 | 11/1990 | Tikes et al. | 315/3.5 |
| 4,980,553 | 12/1990 | Henry | 250/369 |
| 5,034,795 | 7/1991 | Henry | 257/431 |
| 5,053,778 | 10/1991 | Imhoff | 342/191 |
| 5,071,055 | 12/1991 | Grauleau et al. | 228/122.1 |
| 5,104,580 | 4/1992 | Henry et al. | 252/200 |
| 5,132,591 | 7/1992 | Santonja et al. | 315/3.5 |
| 5,132,592 | 7/1992 | Nugues et al. | 315/3.5 |
| 5,179,638 | 1/1993 | Dawson et al. | 395/125 |
| 5,355,442 | 10/1994 | Paglieroni et al. | 395/127 |
| 5,417,890 | 5/1995 | Epron et al. | 252/500 |
| 5,523,021 | 6/1996 | Epron et al. | 252/500 |
| 5,550,937 | 8/1996 | Bell et al. | 382/293 |
| 5,781,146 | 7/1998 | Frederick | 342/26 |
| 5,886,662 | 3/1999 | Johnson | 342/25 |

OTHER PUBLICATIONS

Fosgate, C.H. et al, "Multiscale segmentation and anomaly enhancement of SAR imagery", IEEE Transactions on Image Processing, vol. 6, pp. 7–20, Jan. 1997.

Muller, H.J., "Modeling of extremely heterogeneous radar backscatter", IGARSS '97, vol. 4, pp. 1603–1605.

Darrah, C.A. et al, "Site specific clutter modeling using DMA digital terrain elevation data (DTED), digital feature analysis data (DFAD), and Lincoln Laboratory five frequency clutter amplitude data", Proc. of the 1996 IEEE Radar Conf., pp. 178–183.

Bluck, M.J. et al, "Time domain BIE analysis of large–three–dimensionalelectromagnetic scattering problems", Antennas and Propagation, IEEE Transactions on vol.: 45 5, May 1997, pp. 894–901.

Vadon, H., "Interferogram quality versus digital elevation model characteristics", Geoscience and Remote Sensing Symposium, 1995. IGARSS '95. 'Quantitative Remote Sensing for Science and Applications', International vol.: 1, 1995, pp.: 541–543 vo.

Reinig, K.D., "Rapid radar backscatter simulation of detailed targets", Aerospace and Electronic Systems, IEEE Transactions on vol.: 26 5, Sep. 1990, pp.: 858–866.

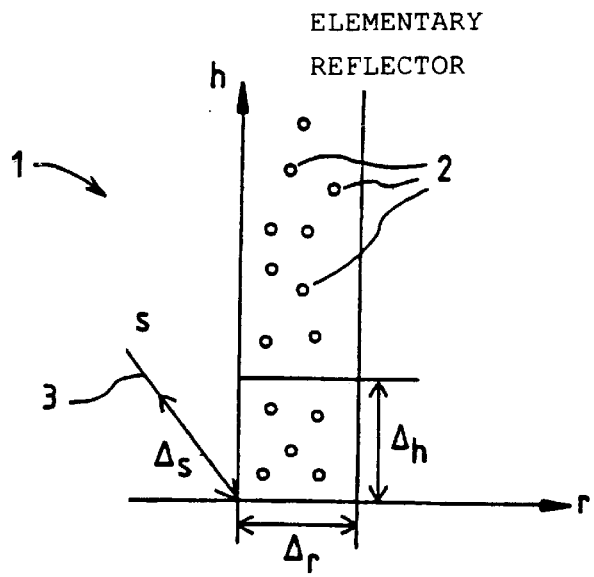
FIG.1
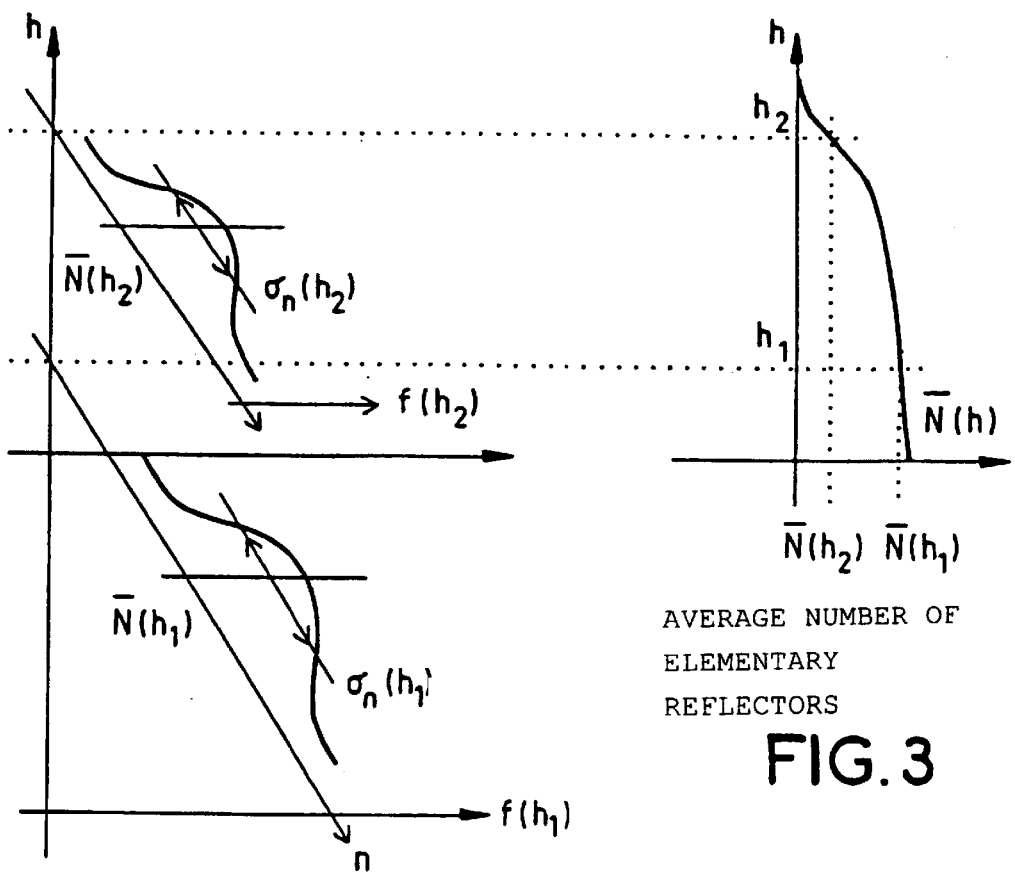
FIG.3
AVERAGE NUMBER OF ELEMENTARY REFLECTORS
FIG.2

METHOD FOR FINE MODELLING OF GROUND CLUTTER RECEIVED BY RADAR

BACKGROUND OF THE INVENTION

1. Field of the Invention

The present invention relates to a process for fine modelling of the ground clutter received by a radar.

2. Discussion of the Background

For the purpose of evaluating performance, radar specialists have long sought to simulate the radar echoes which will be returned by the ground ("clutter") when the radar is deployed and put into service at its location of use, without having to wait for the radar actually to be installed there.

Since the characteristics of the clutter are highly dependent on the location of installation, it is important to be able accurately to model the ground clutter with which the radar will have to cope in the places where it is installed.

Since there are no maps giving the characteristics of clutter over the entire Earth and in all frequency bands and under all polarizations, the most appropriate starting data are numerical terrain models. These cover practically the whole planet and give, in digitized form, at every point of a grid of reasonably fine spacing, the altitude and the nature of the ground, as well as an indication of the nature of the elements present on it (forests, roads, rivers, structures, etc.). They are the starting point of many modern simulations of ground clutter.

Known methods, for example modelling software based on numerical terrain models developed by MIT in the USA, take account, for each terrain element considered, of the angle of illumination, the propagation of the waves between the radar and the relevant location (with, in some cases, allowance for masking effects and reflections) and an estimate of the reflectivity of the ground deduced from the angle of incidence and the category of landscape encountered. The average height of the objects present on the relevant terrain element is used only to calculate the angle of incidence and the propagation attenuation.

At best, the ground clutter is calculated there by determining, from the height of the ground, plus possibly the average height of the objects, the angle of incidence of the waves received from the radar, and by then estimating a radar reflectivity (the ratio of the radar cross section to the unit of physical area). This reflectivity is chosen from among several possible values, the choice being guided by the frequency band used, the polarization, the angle of illumination and the type of landscape (rural, urban, plain, mountain).

The results obtained with the prior art methods exhibit, as compared with the actual reality, sizeable errors whenever the ground bears elements of significant vertical extent. This is because such elements are the major contributors of ground clutter at low, sometimes grazing angles of incidence, and the choice, relatively arbitrary, of a reflectivity value corresponding to the average of a landscape does not take them into account correctly; hence the deviations noted.

This lessens the credibility of the performance predictions deduced therefrom, in particular in the case of surface radars which view the ground at very low angles of incidence, and for which elements present on the ground are the main source of echoes with widely dispersed amplitudes.

SUMMARY OF THE INVENTION

The object of the present invention is a process for fine modelling of the ground clutter received by a radar at low angles of incidence, starting from a numerical terrain model, which makes it possible to model the clutter of any terrain, irrespective of its cover (vegetation and/or structures) to the scale of the resolution cell, that is to say reproducing the texture of clutter maps as faithfully as possible.

The process of the invention consists, starting from a meshed numerical terrain model, in identifying the cells which comprise elements having a height greater than the resolution of the model, in determining, for the relevant cells, the average height of these elements, in chopping up the cells into height-wise slices and in calculating the power backscattered by each relevant cell by replacing its contents with elementary reflectors distributed over its entire height while taking into account the adjoining cells and the profile of the terrain situated between the radar and the relevant cell.

BRIEF DESCRIPTION OF THE DRAWINGS

The present invention will be better understood on reading the detailed description of an embodiment taken by way of non-limiting example and illustrated by the appended drawing in which:

FIG. 1 is a simplified diagram representing a modelled clutter element for any obstacle, FIG. 2 is a diagram representing the probability density of the number of elementary reflectors of an obstacle, for two different heights, and FIG. 3 is a diagram of an example of a function for determining the average number of elementary reflectors along the height of an obstacle.

DETAILED DESCRIPTION OF THE PREFERRED EMBODIMENTS

Represented in FIG. 1 is part of a clutter element 1, for example a modelled forest, composed of a large number of elementary reflectors 2 (discretized), these elementary reflectors representing the leaves of trees in the present case. The incident and reflected radar beam has been depicted at 3. Since clutter is, for a radar, a complex object, in respect of which it is inconceivable to locate the various elementary reflectors, the invention proposes to regard this object as consisting of a large number of reflectors for which the phases of the echoes returned are random. In this case, if the reflectors are illuminated uniformly by the radar, the total radar cross section tends to the sum of the elementary cross sections. There is therefore cause to examine the height-wise distribution of these elementary reflectors.

Represented in FIG. 2 is the probability density of the number of elementary reflectors for the clutter in question, for two different altitudes, h1 and h2. It is assumed that the forest to be modelled is a homogeneous medium. In this case, all the reflectors are identical and their radar cross section does not depend on their altitude h.

FIG. 3 shows how the average number (or the density) of the elementary reflectors varies as a function of their altitude h For a given altitude h, the number of reflectors is a random variable, of which the average value is represented in this FIG. 3. It is easy, for the person skilled in the art, to then calculate this average density and the standard deviation of the distribution of elementary reflectors for a given height.

According to the invention, the relevant clutter element, which has been modelled in this way by a vertical distribution of its reflectors, is divided into N elementary segments for each of which is calculated, in a manner known per se, the average backscattered field, which therefore depends on the characteristic parameters of the elementary reflectors, namely their elementary radar cross section and their average density as a function of their altitude and the value of the incident field for this altitude, this field depending on the obstacles situated between the radar and the relevant clutter element.

An existing numerical terrain model is used to implement the process of the invention. Such a model is formed of terrain mesh cells whose dimensions and resolution are suitable at present (for example mesh cells of around 60×90 m), especially since they can be improved at present by supplementing their information with statistical descriptions, and with data from other sources as the case may be. Of course, the process of the invention will offer a modelling procedure which is even closer to reality when the quality of these models is improved.

According to the process of the invention, from among the cells of the mesh of this model are determined those which comprise reflector elements which extend significantly in height, that is to say elements (leaves of trees, structures, etc.) whose height is greater than the resolution of the model (for example a spacing of around 2 to 5 meters). For each of these cells, the total power backscattered towards the radar is calculated, in the manner set out above. It will simply be noted that use is then made either of the average height of the elements contained in the cell if the numerical terrain model so indicates, or by deducing it from the nature of these elements. For example, in the case of a forest composed mainly of evergreen trees, its height is fixed at 20 m with a standard deviation of 5 m.

The process of the invention starts from an existing numerical terrain model and consists in calculating, for the mesh cells identified by the numerical terrain model as containing elements having a vertical extent, the total power backscattered towards the radar. This is done by using the average height of the elements of the cell if the numerical terrain model so indicates, or, if not, by deducing it from the nature of these elements.

The average height having been estimated, the backscattered power is calculated by replacing the contents of the relevant cell with elementary reflectors distributed over its entire height and corresponding to a chopping up into altitude slices. The radio characteristics and the geometrical distribution of these elementary reflectors are estimated from indications describing the nature of the objects which the cell comprises. Calculation of the signal received by the radar is then carried out by determining, for each height slice, the power received and then backscattered taking into account, in particular, the adjoining cells and the profile of the terrain situated between the radar and the relevant cell. This calculation is repeated for all the cells of the mesh.

Comparisons made between the ground clutter simulated using the process of the invention and the ground clutter observed show that the process of the invention leads to a very faithful representation of reality, even for zones comprising numerous elements having a vertical extent. It therefore improves the representativity of simulations in places where the prior art methods are deficient.

The improvement afforded is all the more useful since it is in these particular places that the ground echoes which are the most dispersed in terms of amplitude, and hence the most liable to hamper proper operation of the radar, are generated. Indeed, it is established that the large swing in the ground clutter received by a surface radar (hence a radar which views the ground at low angles of incidence, unlike for example airborne radars) is due in large part to the vertical elements present on the ground. By affording an effective solution in respect of the modelling of these elements and the radio masks which they generate, the process of the invention brings the simulated closer to the observed, and precisely where this is useful for predicting the performance of surface radars.

Two particular non-limiting exemplary implementations of the process of the invention will now be set out.

1) Plain and Forest

Consider a zone comprising, according to a numerical terrain model, a forest preceded by a bare plain (that is to say with no structures, pylons or trees) in a configuration such that the edge of the forest is directly visible to the radar. The clutter produced by the plain will be simulated by using the prior art methods: average reflectivity for the frequency used, the angle of incidence of the waves and the nature of the terrain (meadowland, cultivated fields, marshland, etc.).

The clutter originating from the edge of the forest will be calculated by means of an equivalent structure consisting of randomly oriented dielectric discs distributed altitude-wise above the ground in proportion to the 1 complement of the integral of a Gaussian function. This Gaussian function represents the distribution of the height of the forest, whose average, indicated by the numerical terrain model, is equal to 16 meters and whose standard deviation is 3 meters. A similar process is carried out for the remainder of the forest, taking account of the masks constituted by the obstacles encountered, which attenuate the radar signal.

The diameter of the discs is deduced from the type of forest indicated by the numerical terrain model, for example 5 cm for the type of foliage indicated, and the density of the discs is taken to be 8 per $m^2$ following the analysis of actual measurements.

The relative permittivity of the dielectric discs is taken, for the frequency band used (L band) to be 20–j6, a value deduced from the analysis of actual measurements.

The equivalent structure is thus completely defined and the corresponding clutter completely calculatable.

2) Structures

Likewise, clutter originating from built-up zones (industrial zone, town, village) is calculated after complete determination of the equivalent structure. For example, for an industrial zone (values deduced from the analysis of actual measurements):

number of elementary reflectors (randomly oriented vertical dielectric plates) : 0.03 per $m^2$, distribution of elementary reflectors: 1 complement of the integral of a Gaussian distribution with average 30 meters above the ground and standard deviation 10 meters, relative permittivity of the dielectric plates: 20–j2 for the frequency band used (L band), average area of the dielectric plates: 1 $m^2$.

Here again, it can be seen that the equivalent structure is completely defined and the corresponding clutter completely calculatable.

The process of the invention improves the faithfulness of the simulation as compared with the existing methods, by implementing a particular method for calculating the radar reflectivity of elements having a vertical extent (trees, buildings, pylons, reservoirs, etc.) and viewed by the radar.

The process of the invention has been validated by comparisons between simulated clutter and actual clutter over diverse geographical zones. The deviation between the actual and the simulated is significantly less than with the traditional methods.

We claim:

1. A process for modelling of ground clutter received by a radar, starting from a meshed numerical terrain model, said process comprising:

identifying cells from said meshed numerical terrain model which comprise elements having a height greater than a resolution of said model;

determining, for relevant cells, an average height of said elements;

sectioning said relevant cells into height-wise slices; and calculating power backscattered by each of said relevant cells by representing contents thereof with elementary reflectors distributed over an entire height thereof as a function of adjoining cells and a profile of terrain situated between said radar and a relevant cell.

2. The process according to claim 1, further comprising distributing said elementary reflectors according to a distribution whose statistical parameters are determined as a function of said elements.

3. The process according to claim 2, further comprising distributing said elementary reflectors as randomly oriented dielectric discs, in a case where said elements comprise ground clutter from a forest.

4. The process according to claim 2, further comprising distributing said elementary reflectors as randomly oriented vertical rectangular dielectric plates, in a case where said elements comprise ground clutter from structures.

5. The process according to claim 2, further comprising determining the statistical parameters of the distributions from measurements on actual ground clutter.

6. The process according to claim 3, further comprising determining the statistical parameters of the distributions from measurements on actual ground clutter.

7. The process according to claim 4, further comprising determining the statistical parameters of the distributions from measurements on actual ground clutter.

* * * * *